United States Patent [19]

Sinclair

[11] 4,057,537
[45] * Nov. 8, 1977

[54] COPOLYMERS OF L-(−)-LACTIDE AND EPSILON CAPROLACTONE

[75] Inventor: Richard G. Sinclair, Columbus, Ohio

[73] Assignee: Gulf Oil Corporation, Pittsburgh, Pa.

[*] Notice: The portion of the term of this patent subsequent to Aug. 30, 1994, has been disclaimed.

[21] Appl. No.: 544,788

[22] Filed: Jan. 28, 1975

[51] Int. Cl.$^2$ ............................................. C08G 63/08
[52] U.S. Cl. ................................................. 260/78.3 R
[58] Field of Search .................................. 260/78.3 R

[56] References Cited

U.S. PATENT DOCUMENTS

| | | | |
|---|---|---|---|
| 2,362,511 | 11/1944 | Teeters | 260/78.3 |
| 2,683,136 | 7/1954 | Higgins | 260/78.3 |
| 2,703,316 | 3/1955 | Schneider | 260/78.3 |
| 3,169,945 | 2/1965 | Hostettler et al. | 260/78.3 |
| 3,284,417 | 11/1966 | Hostettler et al. | 260/78.3 |
| 3,636,956 | 1/1972 | Schneider | 128/335.5 |
| 3,736,646 | 6/1973 | Schmitt et al. | 29/458 |
| 3,839,297 | 10/1974 | Wassermann et al. | 260/78.3 R |

FOREIGN PATENT DOCUMENTS 808,731  3/1969  Canada.

*Primary Examiner*—Harold D. Anderson
*Assistant Examiner*—E. A. Nielsen

[57] ABSTRACT

Copolymers which can be fabricated into films, fibers and structural shapes are prepared by copolymerizing an optically active lactide, i.e., L-(−)-lactide, and epsilon caprolactone in the presence of a tin ester of a carboxylic acid. A copolymer prepared from 75 parts by weight of L-(−)-lactide and 25 parts by weight of epsilon caprolactone is a thermoplastic elastomer. A copolymer prepared from 90 parts by weight of L-(−)-lactide and 10 parts by weight of epsilon caprolactone is a rigid, clear, thermoplastic solid.

6 Claims, No Drawings

COPOLYMERS OF L-(−)-LACTIDE AND EPSILON CAPROLACTONE

BACKGROUND OF THE INVENTION

Thermoplastics are becoming increasingly popular for use in automobiles, housing, appliances, household goods and packaging. Among the materials which have been widely used for such purposes are high- and low-density polyethylene, polyvinyl chloride, polypropylene and polystyrene. While plastics made from these materials have been satisfactory, the raw materials used in their preparation are largely of petroleum origin. Since the demand for petroleum for all uses is ever increasing and since the supply is subject to depletion inventories, attempts are being made to develop thermoplastics from raw materials which are not dependent upon petroleum feedstocks. Also, in view of the growing concern of environmentalists over the disposal of waste materials, attempts are being made to develop thermoplastics which can be made from renewable resources and which are biodegradable to harmless substances. Still further, attempts are being made to develop thermoplastics which, if incinerated, will burn with a clean, blue flame.

Among the raw materials of nonpetroleum origin which have been used to produce thermoplastics are cyclic esters such as glycolide, lactide and the lactones. Glycolide, for example, has been polymerized to produce homopolymers which are reported to be useful in making prosthetic devices. Lactide has been polymerized to produce homopolymers which are reported to be useful in making adhesives, safety glass and finishes. Lactones have been polymerized to produce homopolymers which are reported to be useful in making moldings, coatings, fibers and films. In addition to the formation of homopolymers, the cyclic esters have been interpolymerized to form copolymers including terpolymers. Glycolide, for example, has been copolymerized with lactide and with various lactones to form copolymers which are reported to be useful in making absorbable sutures. Absorbable sutures are also reported to be obtainable when an optically active lactide, e.g., L-(−)-lactide or D-(+)-lactide is copolymerized with optically inactive D,L-lactide and when either L-(−)-lactide, D-(+)-lactide or D,L-lactide is copolymerized with other polymerizable cyclic esters having a 6- to 8-membered ring.

Homopolymers and copolymers of various cyclic esters such as glycolide, lactide and the lactones have been disclosed in numerous patents and scientific publications. See for example, U.S. Pat. Nos. 2,362,511; 2,683,136; 2,758,987; 3,021,309; 3,297,033; 3,463,158; 3,531,561; 3,620,218; 3,636,956; and 3,736,646; Canadian Pat. No. 863,673; British Pat. No. 779,291; German Pat. No. 1,153,902; Collected Papers of Wallace H. Carothers, Vol. 1, Interscience Publishers, Inc., New York (1940); F. J. van Natta et al, Jour. Amer. Chem. Soc. 56, 455 (1934); Ber. Deut. Chem. 36, 1200 (1903); W. H. Carothers et al, Jour. Amer. Chem. Soc. 54, 761 (1932); and K. Chujo et al, Die Makromolekulare Chemie 100, 262-266 (1967). In addition to the above patents and publications, U.S. Pat. No. 2,703,316 to A. K. Schneider, Mar. 1, 1955, POLYMERS OF HIGH MELTING LACTIDE, discloses that lactide homopolymers capable of being formed into tough, orientable, self-supporting thin films can be obtained by heating lactide having a melting point above 120° C. to a temperature above the melting point of the lactide and below 200° C. in the presence of a polyvalent metal oxide such as litharge. The patent to Schneider also discloses that orientable copolymers of lactide can be obtained by heating a mixture of lactide having a melting point above 120° C. with glycolide, with tetramethyl glycolide, and with other polymerizable cyclic esters having a 6- to 8-membered ring (column 5, lines 10-15). According to the patent to Schneider, it is essential that the lactide have a melting point above 120° C. (column 3, lines 50-53). If, for example, a lactide having a melting point of 118° C. is employed, the resulting polymer is reported to be brittle and cannot be formed into drawable films (column 4, lines 58-60). The catalyst is a polyvalent metal oxide or a salt of such a metal, e.g., calcium, titanium, zinc, cadmium, antimony, magnesium and lead.

Canadian Pat. No. 808,731 to R. A. Fouty, Mar. 18, 1969, PREPARATION OF HIGH MOLECULAR WEIGHT POLYLACTIDES, discloses that lactide homopolymers can be obtained by heating L-(−)-lactide, D-(+)-lactide or mixtures thereof at a temperature of 20° to 200° C., preferably 90° to 160° C. in the presence of a divalent Group II metal hydrocarbyl catalyst such as diethylzinc, di-n-butylzinc and diethylmagnesium. The patent to Fouty also discloses that the lactides can be copolymerized with other polymerizable cyclic esters having a 6- to 8-membered ring, e.g., glycolide or tetramethyl glycolide (Page 2, lines 20-23). The polylactides as shown by the general formula in the Fouty patent (Page 1, line 24 and Page 7, line 11) and as described in the patent (Page 8, lines 2-3) contain the Group II metallic component of the catalyst in the form of a lactate. That the metallic component of the catalyst appears in the polylactides in the form of a metallic lactate is considered to be of significance in the preparation of sutures which require a high degree of non-toxicity (Page 8, lines 1-5).

SUMMARY OF THE INVENTION

In accordance with the present invention, thermally stable copolymers of an optically active lactide, i.e., L-(−)-lactide, and epsilon caprolactone are obtained by heating a mixture of L-(−)-lactide having a melting point below 100° C., for example, about 96° to about 98° C., and epsilon caprolactone at a temperature above the melting point of L-(−)-lactide and below 200° C. in the presence of a catalyst consisting of a tin ester of a carboxylic acid containing up to 18 carbon atoms. The lactide-caprolactone copolymers thus obtained have weight-average molecular weights of 15,000 to 300,000 and can be readily fabricated into highly useful films, fibers and structural shapes having desirable physical properties. The copolymers, depending upon the ratio of lactide to caprolactone employed in the copolymerization, are quite versatile in their physical characteristics ranging from elastomers that are clear, tough and have good strength and modulus to thermoplastics that are clear, tough, strong, tractable and have good form stability and impact resistance. A copolymer prepared from 75 parts by weight of L-(−)-lactide and 25 parts by weight of epsilon caprolactone is an easily moldable, thermoplastic elastomer having a molecular weight in excess of 90,000. A copolymer prepared from 90 parts by weight of L-(−)-lactide and 10 parts by weight of epsilon caprolactone has a weight-average molecular weight in excess of 100,000 and is easily melt-pressed into tough, strong moldings. The copolymers of L-(−)-lactide and epsilon caprolactone are insoluble in water but upon constant contact with water are slowly degradable. Thus, throwaway objects made from copolymers of L-(—)-lactide and epsilon caprolactone are environmentally attractive in that they slowly degrade to harmless substances. If objects made from copolymers of L-(—)-lactide and epsilon caprolactone are incinerated, they burn with a clean, blue flame.

DETAILED DESCRIPTION OF THE INVENTION

The proportions of L-(—)-lactide and epsilon caprolactone used in preparing the copolymers in accordance with the invention can vary over a wide range. The exact amount of L-(—)-lactide and epsilon caprolactone in any given instance will depend upon the properties desired in the ultimate copolymer. Broadly, the concentration of L-(—)-lactide in the mixture of L-(—)-lactide and epsilon caprolactone which is heated to form copolymers is in the range of about 50 to about 97 weight percent, based on the total weight of the mixture. The concentration of epsilon caprolactone in the mixture of L-(—)-lactide and epsilon caprolactone which is heated to form the copolymer is in the range of about 50 to about 3 weight percent, based on the total weight of the mixture. When equal parts by weight of L-(—)-lactide and epsilon caprolactone are used in forming the copolymer, the copolymer has good elongation characteristics and can be easily molded, but the copolymer is weak and gummy. When the copolymer is formed from 97 parts by weight of L-(—)-lactide and 3 parts by weight of epsilon caprolactone, the copolymer is hard and brittle. The preferred range of L-(—)-lactide is from about 75 to about 90 weight percent. I have found, quite unexpectedly that a copolymer prepared from 75 parts by weight of L-(—)-lactide and 25 parts by weight of epsilon caprolactone is a thermoplastic elastomer and that a copolymer prepared from 90 parts by weight of L-(—)-lactide and 10 parts by weight of epsilon caprolactone is a rigid, clear, thermoplastic solid. Copolymers of L-(—)-lactide and epsilon caprolactone can be formed when less than 50 percent of L-(—)-lactide is used. However, the melting point of the copolymer decreases with decreasing amounts of L-(—)-lactide. When more than 97 percent of L-(—)-lactide is employed in making the copolymer, the impact strength of the copolymer is very low and the compression molding temperature is high.

The optically active L-(—)-lactide employed in accordance with the invention is available commercially so that neither the compound per se nor the method by which it is prepared constitutes any portion of the invention. L-(—)-lactide is a cyclic dimer of L-(+)-lactic acid. One of the methods reported in the literature for preparing a lactide is to dehydrate lactic acid under high vacuum. The product is distilled at a high temperature and low pressure. Lactides and their preparation are discussed by W. H. Carothers, G. L. Dorough and M. J. Johnson (J. Am. Chem. Soc. 54, 761–762 [1932]); J. Gay-Lussac and J. Pelouse (Ann. 7, 43 [1833]); C. A. Bischoff and P. Walden (Chem. Ber. 26, 263 [1903]; Ann. 279, 171 [1894]); and Heinrich Byk (Ger. Pat. 267,826 [1912]); through Chem. Abstr. 8, 554, 2034 [1914]). L-(+)-lactic acid which is used in the preparation of L-(—)-lactide is available commercially. The optically active acids can be prepared by direct fermentation of almost any nontoxic carbohydrate product, by-product or waste, utilizing numerous strains of the bacterial genus Lactobacillus, e.g., *Lactobacillus delbrueckii*. The optically active acids can also be obtained by the resolution of the racemic mixture through the zinc ammonium salt, or the salt with alkaloids, such as morphine. L-(—)-lactide is a white powder having a molecular weight of 144. If a commercially available product is employed in accordance with the present invention, I prefer to purify it by recrystallization from anhydrous methyl isobutyl ketone. The snow-white crystals of L-(—)-lactide melt at 96° to 98° C.

The epsilon caprolactone employed in accordance with the invention is available commercially so that neither the compound per se nor the method by which it is obtained constitutes any portion of the invention. According to one method, epsilon caprolactone is prepared by oxidizing cyclohexanone with an anhydrous solution of peracetic acid and acetone. The product thus obtained comprises acetic acid and epsilon caprolactone. When this method is used, it is desirable to add the peracetic acid-acetone solution to an excess of the cyclohexanone, e.g., 5 to 1 molar ratio of cyclohexanone to peracetic acid, in a vessel maintained under reflux. The epsilon caprolactone is recovered from the vessel by conventional distillation. The cyclohexanone used in the preparation of epsilon caprolactone is an intermediate product in the preparation of caprolactam. Cyclohexanone can be obtained either by the hydrogenation of phenol or the oxidation of cyclohexane. If a commercially available epsilon caprolactone is used in accordance with the invention, I prefer to purify the material by vacuum distillation. According to a typical purification procedure, epsilon caprolactone is subjected to distillation in a vacuum distillation column, separately collecting that portion boiling at 56° to 57° C./0.4 torr. Epsilon caprolactone is water-white with a single gas-chromatography peak.

In preparing the L-(—)-lactide/epsilon caprolactone copolymers in accordance with the invention, it is preferred to carry out the reaction in the liquid phase in a closed, evacuated vessel in the presence of a tin ester of a carboxylic acid containing up to 18 carbon atoms. The copolymers however, can also be prepared at atmospheric pressure with the polymerization system blanketed by an inert gas such as, for example, nitrogen. If polymerization is conducted in the presence of air, some discoloration occurs with a resulting decrease in molecular weight and tensile strength. The process can be carried out at any temperature between the melting point of the L-(—)-lactide and 200° C. Thus, at atmospheric pressure the temperature can be within the range of about 95° to 200° C. While a temperature below 95° C. can be used in the polymerization reaction if the reactants are dispersed or dissolved in an inert liquid vehicle, the use of such a lower temperature prolongs the copolymerization and may result in less desirable copolymers. Temperatures above 200° C. are undesirable because of the tendency of the copolymer to be degraded. Increasing the temperature within the range of 95° to 200° C. generally increases the speed of the polymerization. Good results are obtained by heating a mixture of L-(—)-lactide and epsilon caprolactone at a temperature between about 110° C. and 160° C.

The catalysts employed in accordance with the invention are tin esters of carboxylic acids containing up to 18 carbon atoms. Examples of such acids are formic, acetic, propionic, butyric, valeric, caproic, caprylic, pelargonic, capric, lauric, myristic, palmitic, stearic and benzoic acids. Good results have been obtained with stannous acetate and stannous caprylate.

The catalyst is used in normal catalytic amounts. In general, a catalyst concentration in the range of about 0.001 to about 2 percent by weight, based on the total weight of the L-(−)-lactide and epsilon caprolactone is suitable. A catalyst concentration in the range of about 0.01 to about 1.0 percent by weight is preferred. I have obtained good results when the catalyst concentration is in the range of about 0.02 to about 0.5 percent by weight. The exact amount of catalyst in any particular case depends to a large extent upon the catalyst employed and the operating variables including time, temperature and pressure.

The reaction time, in most instances, is governed by the other reaction variables including the reaction temperature, the pressure, the particular catalyst, the amount of catalyst and whether a liquid vehicle is employed. The reaction time can vary from a matter of seconds to a period of hours, or days, depending upon the particular set of conditions which are employed. In any event, heating of the mixture of L-(−)-lactide and epsilon caprolactone is continued until no further evidence of copolymerization is detectable. Whether copolymerization is complete can be determined by analysis for residual monomers.

In general it is preferred to conduct the polymerization in the absence of impurities which contain active hydrogen since the presence of such impurities tends to deactivate the catalyst and/or increase the induction time. It is also preferred to conduct the polymerization under substantially anhydrous conditions.

The copolymers of the invention can be prepared by bulk polymerization, suspension polymerization or solution polymerization. The polymerization can be carried out in the presence of an inert normally-liquid organic vehicle such as, for example, aromatic hydrocarbons, e.g., benzene, toluene, xylene, ethylbenzene and the like; oxygenated organic compounds such as anisole, the dimethyl and diethyl esters of ethylene glycol; normally-liquid saturated hydrocarbons including open chain, cyclic and alkyl-substituted cyclic saturated hydrocarbons such as hexane, heptane, cyclohexane, alkylcyclohexanes, decahydronaphthalene and the like.

The polymerization process can be conducted in a batch, semi-continuous, or continuous manner. The reaction vessel can be any equipment normally employed in the art of making polymers. One suitable vessel, for example, is a glass-lined vessel. The monomeric reactants and catalyst can be admixed in any order according to known polymerization techniques. Thus, the catalyst can be added to either of the monomeric reactants. Thereafter, the catalyst-containing monomer can be admixed with the other monomer. In the alternative, the monomeric reactants can be admixed with each other. The catalyst can then be added to the reactant mixture. If desired, the catalyst can be dissolved or suspended in an inert normally-liquid organic vehicle. If desired, the monomeric reactants either as a solution or a suspension in an inert organic vehicle can be added to the catalyst, catalyst solution or catalyst suspension. Still further, the catalyst and the monomeric reactants can be added to a reaction vessel simultaneously. The reaction vessel can be equipped with a conventional heat exchanger and/or a mixing device.

In most instances, copolymerization is substantially complete so that there is no unreacted monomeric material in the polymerization mass. If any monomeric material is present in the polymerization mass, the monomer can be removed, if desired, by conventional methods such as by heating the polymerization mass under a reduced pressure and/or by the utilization of a solvent which is selective for the unreacted monomer.

The copolymers produced in accordance with the present invention depending upon the L-(−)-lactide/epsilon caprolactone ratio, find utility in the manufacture of films, fibers, moldings and laminates which are prepared by conventional fabricating methods. Filaments, for example, are formed by melt-extruding the copolymer through a spinneret and then drawing the filaments to at least twice their original length to effect orientation and to improve their tensile strength. Films are formed by casting solutions of the copolymers and then removing the solvent or by pressing solid copolymers in a hydraulic press having heated platens.

Various techniques including slow cooling and rapid cooling can be employed in preparing moldings from the copolymers of the invention. In general, slow-cooled moldings have a greater degree of elongation than moldings which are cooled rapidly, sometimes referred to as quenched moldings. On the other hand, quenched moldings have a greater maximum tensile strength and a greater initial modulus than slow-cooled moldings. Thus, the properties of any given product can be altered to some degree by the method of cooling.

The copolymers produced in accordance with the present invention can be modified, if desired, by the addition of a cross-linking agent, a plasticizer, a coloring agent, a filler and the like. A cross-linking agent such as, for example, 1,6-hexanediol dimethacrylate, can be employed to give a copolymer which is more resistant to the action of solvents. The cross-linking agent is used in an amount sufficient to improve the solvent resistance of the copolymer. In general, the amount of cross-linking agent is within the range of about 0.1 to 10 percent by weight based on the weight of the copolymer. When a cross-linking agent is employed, a temperature between about 60° and about 150° C., preferably between about 120° and 130° C. is employed for a time sufficient to effect cross-linking. A free-radical source provides curing which improves the strength and specific gravity of normally weak, gummy polymers, and improves the resistance of polymers to the action of a solvent such as benzene. Any of a variety of free-radical agents such as, for example, dibenzoyl peroxide, lauroyl peroxide, t-butyl hydroperoxide, t-butyl perbenzoate and di-t-butyl peroxide can be used. The preferred free-radical agent is dibenzoyl peroxide. In general, the amount of free-radical agent is within the range of about 0.1 to 10 percent based on the weight of the copolymer. When a free-radical agent is employed, curing can be conducted at a temperature between about 60° and about 150° C., preferably between about 120° and about 130° C. for a period of time sufficient to effect the cure. The cure can be effected in one step at a single temperature or in several steps at different temperatures. Curing can be effected at a pressure between about 25 and about 1000 psi preferably between about 25 and about 500 psi. When from 4 to 8 percent by weight of dibenzoyl peroxide is employed as a free-radical agent with a copolymer of L-(−)-lactide and epsilon caprolactone, compounding, curing and compression molding are readily effected at 120° to 130° C. to give a copolymer that is colorless, transparent and elastomeric.

In preparing moldings, a filler can be incorporated in the copolymer prior to curing. A filler has the function of modifying the properties of a molding including hardness, strength, temperature resistance, etc. Known filler materials include aluminum powder, powdered calcium carbonate, silica, kaolinite (clay), magnesium silicate and the like.

Copolymers prepared according to the present invention can be used in producing reinforced laminates according to known procedures. In general, laminates are made from a fibrous mat or by assembling a multiplicity of sheets of material to form a matrix which is consolidated into a unitary structure by flowing molten polymer through the fibrous material and curing it while in a mold or hydraulic press to form the polymer. Fibers which are used in forming the matrix include natural and synthetic fibers such as cellulose derived from wood, cotton, linen, hemp, and the like, asbestos, glass, nylon, cellulose acetate and the like.

The copolymers of this invention and their preparation are further illustrated by the following specific examples.

EXAMPLE I

[50/50, L-(—)-Lactide/Epsilon Caprolactone]

250 grams of pure L-(—)-lactide melting at 96° to 98° C. is tumble-dried in vacuo under a nitrogen bleed for 24 hours at room temperature. The dried monomer is transferred to a 1-liter dry glass ampoule wherein it is admixed with 5 ml of benzene (calcium hydride-dried) containing 1 gram of pure stannous caprylate. The ampoule is then re-evacuated to remove solvent and back flushed with nitrogen. 250 Grams (236 ml) of pure epsilon caprolactone distilling at 56° to 57° C./0.35 torr. is then added to the L-(—)-lactide and catalyst in the ampoule. The contents of the ampoule are thoroughly mixed and degassed. The ampoule is then sealed in vacuo at its constriction by means of a torch. The ampoule and its contents are immersed for 69 hours in an oil bath at 126° to 128° C. The ampoule is allowed to cool to allow the copolymer to solidify. The glass ampoule is then shattered and the glass is removed from the solidified copolymer. The resulting copolymer is gummy and has a low tensile strength. The product is definitely a copolymer since its properties are distinctly different from a mere physical blend of the two homopolymers of L-(—)-lactide and epsilon caprolactone. The weight average molecular weight ($\overline{M}_w$) as determined by Gel Permeation Chromatography (GPC) is 115,300. The number average molecular weight ($\overline{M}_n$) is 41,600. The residual lactide comprises 0.97 percent. The copolymer is easily melt-formed by conventional thermoplastic techniques into clear, sparkling sheets. Physical properties of the copolymer are shown in Table 1.

EXAMPLE II

[75/25, L-(—)-Lactide/Epsilon Caprolactone]

375 grams of pure L-(—)-lactide melting at 96° to 98° C. is tumble-dried in vacuo under a nitrogen bleed for 16 hours at room temperature. The dried monomer is transferred to a dry, one-liter glass ampoule wherein it is admixed with 5 ml of benzene (calcium hydride-dried) containing 1 gram of pure stannous caprylate. The ampoule is then re-evacuated to remove solvent and back flushed with nitrogen. 125 Grams (118 ml) of pure epsilon caprolactone distilling at 56° to 57° C./0.35 torr is then added to the L-(—)-lactide and catalyst in the ampoule. The contents of the ampoule are thoroughly mixed and degassed. The ampoule is then sealed in vacuo at its constriction by means of a torch. The ampoule and its contents are immersed for 3 days in an oil bath at 136° to 142° C. The molten monomers are agitated vigorously during the first hour of heating. The ampoule is allowed to cool to allow the copolymer to solidify. The glass ampoule is shattered and the glass removed from the solidified copolymer. The resulting copolymer is a clear, slightly amber, void-free elastomeric solid shown by infrared analysis to be an aliphatic polyester. The product is definitely a copolymer since its properties are distinctly different from a mere physical blend of the two homopolymers of L-(—)-lactide and epsilon caprolactone. The copolymer has GPC molecular weights of $\overline{M}_w = 195,200$ and $\overline{M}_n = 28,900$. The residual lactide comprises about 1.59 percent. Differential thermal analysis (DTA) of the copolymer reveals no detectable crystallinity. Upon stretching the copolymer, it will return to 90 to 95 percent of its original dimensions rather quickly if released before it is stretched beyond an elongation of 100 percent. The copolymer has an outstanding combination of physical properties. The copolymer is clear, abrasion resistant and elastomeric. The copolymer is flexible and has good strength and a high elongation. The copolymer is easily melt-formed by conventional thermoplastic techniques into clear, sparkling sheets, films and other useful items of commerce. Objects formed from the copolymer are slowly biodegradable. Physical properties are listed in more detail in Table 1.

To illustrate the moldability of this copolymer, the copolymer is cut into small slices on a bale cutter. 50 Grams of the sliced copolymer is placed in a 6 × 6 × 0.75 inches mold preheated to 130° C. The heated copolymer is then compression molded in a Preco Press for 5 minutes at 130° C. Excessive heating and the presence of moisture is to be avoided during molding in order to avoid an adverse affect on the molecular weight of the copolymer. The molded sheets thus obtained are clear, sparkling, void-free, colorless and elastomeric. The molded copolymer has GPC molecular weights of $\overline{M}_w = 144,700$ and $\overline{M}_n = 23,200$. The residual lactide comprises about 1.33 percent.

EXAMPLE III

[85/15, L-(—)-Lactide/Epsilon Caprolactone]

The procedure of Example II is repeated except that 461 grams of L-(—)-lactide, 5.4 ml of benzene containing 1.1 gram of pure stannous caprylate and 81.3 grams of epsilon caprolactone are placed in the ampoule, evacuated, sealed and heated for 15.5 hours at 136° to 140° C. The copolymer has an outstanding combination of physical properties. The copolymer is a tough, strong, clear material. It has good impact resistance and a good combination of tensile strength and elongation properties. The copolymer has GPC molecular weights of $\overline{M}_w = 192,200$ and $\overline{M}_n = 44,900$. The residual lactide comprises 1.15 percent. Differential thermal analysis (DTA) of the copolymer reveals a moderate amount of crystallinity with a melting point endotherm at 133° C. Molded sheets of the copolymer are clear, colorless, supple and tough. Physical properties are listed in more detail in Table 1.

EXAMPLE IV

[90/10, L-(—)-Lactide/Epsilon Caprolactone]

The procedure of Example II is repeated except that 500 grams of L-(—)-lactide, 55.5 grams of epsilon caprolactone and 5 ml of benzene containing 1 gram of stannous caprylate are placed in the ampoule, evacuated, sealed and heated for 18 hours at 130° C. and then also takes into consideration the fact that molding can be performed below the decomposition temperature as noted by the differential thermal analysis (DTA).

TABLE 1

| PROPERTIES OF L-(−)-LACTIDE/EPSILON CAPROLACTONE COPOLYMERS | | | | | | |
|---|---|---|---|---|---|---|
| EXAMPLE NO. | I | II | III | IV | V | VI |
| L-(−)-Lactide/Epsilon Caprolactone, Wt. Ratio | 50/50 | 75/25 | 85/15 | 90/10 | 95/5 | 97/3 |
| Tensile Strength[a], psi | | | | | | |
| At Maximum | 80[c] | 1488 | 3254[b] | 6232[b] | 6900[b] | [f] |
| At 100% Elongation | 79 | 400 | 1822 | None | None | None |
| At 300% Elongation | 44 | 950 | 2615 | None | None | None |
| Elongation, percent | | | | | | |
| To Yield | >1000 | >400[c] | 6.4[b] | 8.1[b] | 1.6[b] | [f] |
| To Failure | >1000 | >400 | 500 | 8.1 | 1.6 | [f] |
| Initial Elastic Modulus[a], kpsi | 0.149 | 5.26 | 84 | 167 | 185 | [f] |
| Impact Strength[d] ft-lb/in. | No Break | No Break | No Break | 4.1 | 0.361 | 0.34 to 1.38[f] |
| Shore D Hardness | 5 | 52 | 87 | 91 | 95 | 91[f] |
| Specific Gravity[20/4][e] | 1.208 | 1.199 | 1.234 | 1.245 | 1.260 | 1.258 |
| Volume Resistivity, ohm-cm | — | 6.0×10[13] | 3.5×10[15] | 1.7×10[16] | — | 2.5×10[16] |
| Dielectric Constant, 10³ cyc | — | 7.7 | 5.5 | 4.2 | 4.5 | 5.1 |
| Dissipation Factor, 10³ cyc | — | 0.07 | 0.03 | 0.03 | 0.03 | 0.04 |
| DTA m.p., C | — | None | 133 | 151 | 166 | 182 |
| DTA Decomposition Temp, C | — | 210 | 210 | 208 | 199 | 210 |
| Compression Molding Temp, C | 73–130 | 130±15 | 140±10 | 165±5 | 165±5 | 174±10 |
| Ease of Molding | Exc | Exc | Exc | Exc | Good | Fair |

[a]ASTM D-638. (0.06 to 0.08 inch thick)
[b]Crosshead Speed: 0.2 in./min.
[c]Crosshead Speed: 20 in./min.
[d]Izod Impact D256, without notch.
[e]ASTM D-792
[f]Too brittle to give reliable values.

45 minutes at 160° C. The copolymer has GPC molecular weights of $\overline{M}_w = 223,000$ and $\overline{M}_n = 35,700$. The residual lactide comprises about 1.65 percent. Compression molded specimens are strong and transparent with a DTA melting point of 151° C. when fast cooled. Slow-cooled moldings are opaque and show an increased DTA crystallinity. The molded specimens have GPC molecular weights of $\overline{M}_w = 116,200$ and $\overline{M}_n = 22,000$. The residual monomer comprises about 1.8 percent. Physical properties are listed in more detail in Table 1.

EXAMPLE V

[95/5, L-(−)-Lactide/Epsilon Caprolactone]

The procedure of Example II is repeated except that 329 grams of L-(−)-lactide, 17.3 grams of epsilon caprolactone and 3.5 ml of benzene containing 0.7 gram of stannous caprylate are placed in the ampoule, evacuated, sealed and heated for 48 hours at 105° to 144° C. The copolymer thus obtained can be melt-molded by conventional thermoplastic techniques. The copolymer is an opaque, light yellow copolymer having a substantial melting-point endotherm at 165° C. Physical properties are listed in more detail in Table 1.

EXAMPLE VI

[97/3, L-(−)-Lactide/Epsilon Caprolactone]

The procedure of Example II is repeated except that 490 grams of L-(−)-lactide is heated with 15.2 grams of epsilon caprolactone and 5 ml of benzene containing 1 gram of stannous caprylate. After 64 hours at 138° to 142° C., an opaque, highly crystalline, brittle copolymer is obtained having a strong DTA endotherm at 182° C. Physical properties are listed in more detail in Table 1.

In Table 1, the designation "ease of molding" summarizes a number of observations on copolymer fabricability. Copolymers rated "good" or "excellent" have sufficient melt viscosities over a reasonably broad temperature range to smoothly fill out a mold and stay in place throughout the molding operation. "Ease of molding"

It will be noted from the data summarized in Table 1 that the copolymers are sensitive to composition. Weight ratios of L-(−)-lactide/epsilon caprolactone of 50/50 result in copolymers that are weak, gummy materials although they are easily moldable. Weight ratios of L-(−)-lactide/epsilon caprolactone of 95/5 to 97/3 result in copolymers that have low-elongations and are brittle. While there is a noted change in properties with respect to copolymers prepared from L-(−)-lactide/epsilon caprolactone in weight ratios above about 75/25, there is a further change in properties when the ratio of L-(−)-lactide/epsilon caprolactone exceeds 85/15. For example, the tensile strength at 100 percent elongation for the 85/15 copolymer is greater than four times that for the 75/25 copolymer. The tensile strength at 300 percent elongation for the 85/15 copolymer is almost three times greater than that for the 75/25 copolymer. Also, the initial elastic modulus for the 85/15 copolymer is about sixteen times that for the 75/25 copolymer. It will be noted with respect to impact strength that copolymers prepared from L-(−)-lactide and epsilon caprolactone in weight ratios up to 85/15 (L-(−)-lactide/epsilon caprolactone) do not break whereas the copolymers prepared from L-(−)-lactide and epsilon caprolactone in weight ratios of 90/10 to 97/3 (L-(−)-lactide/epsilon caprolactone) have impact strengths in the range of 0.34 and 4.1. Copolymers prepared from L-(−)-lactide and epsilon caprolactone in weight ratios up to 95/5 (L-(−)-lactide/epsilon caprolactone) have good to excellent molding properties.

Copolymerization of L-(−)-lactide and epsilon caprolactone in the presence of stannous acetate as the catalyst is illustrated by Example VII.

EXAMPLE VII

[75/25, L-(−)-Lactide/Epsilon Caprolactone]

The procedure of Example II is repeated except that 75 grams of L-(−)-lactide, 25 grams of epsilon caprolactone and 0.2 gram of stannous acetate are heated in a vacuum-sealed ampoule for 3 days at 136° to 138° C. Conversion to the copolymer is 93 percent. The copolymer has GPC molecular weights of $\overline{M}_w = 90,500$ and $\overline{M}_n = 29,100$.

Curing of copolymers with a free-radical agent (dibenzoyl peroxide) in accordance with the present invention is illustrated by Examples VIII to X. In Example X, the copolymer is blended not only with a free-radical agent (dibenzoyl peroxide) but also with a cross-linking agent (1,6-hexanediol dimethacrylate).

EXAMPLE VIII

[Curing a 50/50, L-(−)-Lactide/Epsilon Caprolactone Copolymer]

100 Grams of a weak, gummy copolymer prepared from equal parts by weight of L-(−)-lactide and epsilon caprolactone according to the procedure of Example I is blended on a two-roll mill for 15 minutes with 4 grams of dibenzoyl peroxide. No external heat is applied to the rolls, and the temperature of working the copolymer remains less than 65° C. The material remains gummy, can be pulled apart by hand easily, and is easily worked on the mill. A 50-gram portion of the peroxide-copolymer blend thus obtained is compression molded at 120° to 130° C. in a conventional three-piece mold. After 10 minutes, the material which initially flows readily no longer flows even under 1000 psi pressure. Specimens of this cured elastomer are insoluble in benzene, much stronger than the initial copolymer and are easily formed into colorless, transparent, elastomeric sheets. The sheets formed from the cured copolymer degrade slowly, over several hours, in boiling water becoming increasingly tacky. The brittle point (ASTM-D-746) of the cured specimens is −24° C.; the specific gravity at 20°/4° is 1.19; the tensile strength is 108 psi; the initial elastic modulus is 170 psi; and the total elongation is greater than 700 percent.

EXAMPLE IX

[Curing a 75/25, L-(−)-Lactide/Epsilon Caprolactone Copolymer]

110 Grams of a copolymer prepared from 75 parts by weight of L-(−)-lactide and 25 parts by weight of epsilon caprolactone according to the procedure of Example II is blended with 8 grams of dibenzoyl peroxide according to the procedure of Example VIII. The cured copolymer thus obtained is easily molded into colorless, transparent thermosets which are insoluble in benzene. The tensile strength of the cured copolymer is 1560 psi; the total elongation is 450 percent; the initial elastic modulus is 658; and the rebound value (ASTM-D-2632) is 13 percent.

EXAMPLE X

[Curing a 75/25, L-(−)-Lactide/Epsilon Caprolactone Copolymer in the Presence of a Cross-Linking Agent]

The procedure of Example IX is repeated except that 4 grams of a cross-linking agent, i.e., 1,6-hexanediol dimethacrylate, is also blended with the L-(−)-lactide, epsilon caprolactone and dibenzoyl peroxide. These materials blend easily and upon molding and curing form clear, colorless sheets. The sheets thus formed have a tensile strength of 1550 psi; the total elongation is 380 percent; the initial elastic modulus is 783; and the rebound value (ASTM-D-2632) is 38 percent. The cured specimens are noticeably less swollen in benzene than similar sheets of Example IX.

The L-(−)-lactide/epsilon caprolactone copolymers of the present invention are versatile in properties depending upon the L-(−)-lactide/epsilon caprolactone ratio. As a result the copolymers of the invention are useful in manufacturing a variety of materials varying from gummy adhesives to self-supporting rigid objects for automobiles, housing, appliances, household goods, packaging and the like.

While my invention has been described above with reference to various specific examples and embodiments, it will be understood that the invention is not limited to such illustrated examples and embodiments and may be variously practiced within the scope of the claims hereinafter made.

I claim:

1. A non-gummy, high impact, non-brittle, thermally stable copolymer of an optically active lactide and epsilon caprolactone, said copolymer being obtained by heating a mixture of L-(−)-lactide having a melting point below 100° C. and epsilon caprolactone at a temperature above the melting point of L-(−)-lactide and below 200° C. in the presence of a catalyst, said mixture comprising about 75 to about 90 percent by weight of L-(−)-lactide.

2. A non-gummy, high impact, non-brittle thermoplastic elastomer of an optically active lactide and epsilon caprolactone, said elastomer being obtained by heating 75 parts by weight of L-(−)-lactide having a melting point below 100° C. and 25 parts by weight of epsilon caprolactone at a temperature above the melting point of L-(−)-lactide and below 200° C. in the presence of a tin ester of a carboxylic acid containing up to 18 carbon atoms.

3. A thermoplastic elastomer in accordance with claim 2 wherein the L-(−)-lactide and epsilon caprolactone are heated at about 135° to about 145° C.

4. A rigid, clear, non-gummy, high impact, non-brittle thermoplastic solid of an optically active lactide and epsilon caprolactone, said solid being obtained by heating 90 parts by weight of L-(−)-lactide having a melting point below 100° C. and 10 parts by weight of epsilon caprolactone at a temperature above the melting point of L-(−)-lactide and below 200° C. in the presence of a tin ester of a carboxylic acid containing up to 18 carbon atoms.

5. A rigid, clear, thermoplastic solid in accordance with claim 4 wherein the L-(−)-lactide and epsilon caprolactone are heated at about 130° to about 160° C.

6. A thermally stable copolymer in accordance with claim 1 wherein said catalyst is a tin ester of a carboxylic acid containing up to 18 carbon atoms.

* * * * *